United States Patent
Kumita

[19]
[11] Patent Number: 6,118,743
[45] Date of Patent: Sep. 12, 2000

[54] INFORMATION STORAGE APPARATUS RAPIDLY RETURNING FROM A SLEEP MODE TO A REGULAR OPERATION MODE AND A METHOD FOR CONTROLLING A SPINDLE MOTOR IN SUCH AN APPARATUS

[75] Inventor: Hiroshi Kumita, Kawasaki, Japan

[73] Assignee: Fujitsu Limited, Kawasaki, Japan

[21] Appl. No.: 09/126,403

[22] Filed: Jul. 30, 1998

[30] Foreign Application Priority Data

Oct. 31, 1997 [JP] Japan ..................... 9-301051

[51] Int. Cl.⁷ ........................................ G11B 5/09
[52] U.S. Cl. ................................. 369/50; 369/54
[58] Field of Search ........................ 369/47, 48, 49, 369/50, 54, 58; 360/27

[56] References Cited

FOREIGN PATENT DOCUMENTS 5-274782  10/1993  Japan .
7-201119  8/1995   Japan .
7-220370  8/1995   Japan .

*Primary Examiner*—Paul W. Huber
*Attorney, Agent, or Firm*—Greer, Burns & Crain, Ltd.

[57] ABSTRACT

An information storage apparatus can be set to a sleep mode and returned from the sleep mode to a regular operation mode in a short time. A clock generating circuit generates a first clock and a second clock having a frequency different from the frequency of the first clock. A control circuit is operated by the first clock for controlling storage of information on a recording medium. The recording medium is rotated by a motor at a first speed for storing information. The motor is operated by a clock corresponding to the first clock. A time is measured after a final access is made to the recording medium. The frequency of the first clock is changed when the measured time reaches a predetermined time, and the clock supplied to the motor is switched from the first clock to the second clock.

13 Claims, 9 Drawing Sheets

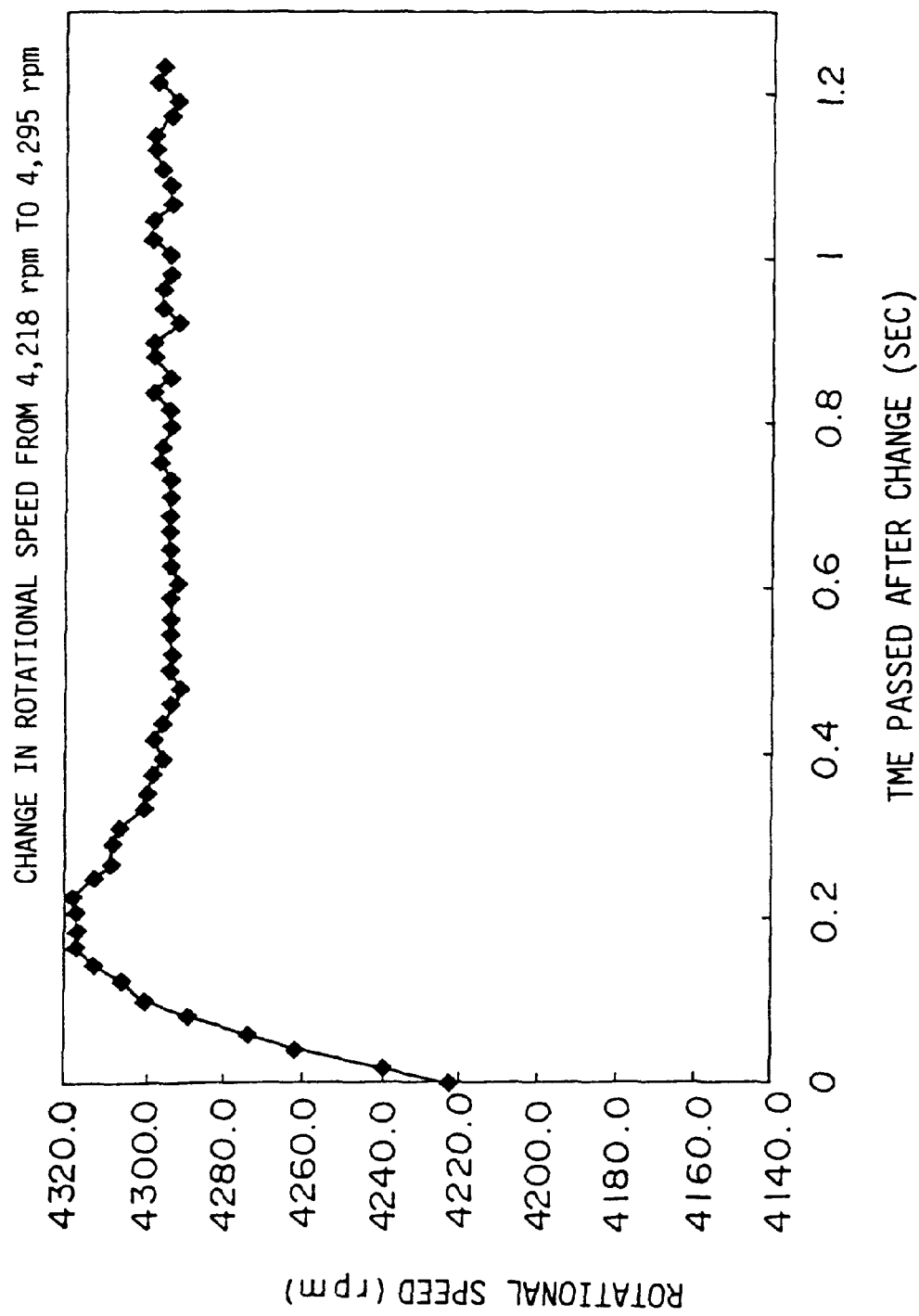

INFORMATION STORAGE APPARATUS RAPIDLY RETURNING FROM A SLEEP MODE TO A REGULAR OPERATION MODE AND A METHOD FOR CONTROLLING A SPINDLE MOTOR IN SUCH AN APPARATUS

BACKGROUND OF THE INVENTION

1. Field of the Invention

The present invention generally relates to an information storage apparatus and, more particularly, to an information storage apparatus which controls an operation thereof by reducing a clock frequency during a sleep mode.

The present invention also relates to a method for controlling a spindle motor used in an information storage apparatus.

In an information storage apparatus such as a disc drive unit, a sleep mode is provided so as to reduce power consumption when there is no access by a host computer for a predetermined time period. In the sleep mode, power consumption is reduced by sequentially deactivating circuit operations. Specifically, in the sleep mode, when there is no access by the host computer for a predetermined time period, operations of circuits are sequentially stopped by stopping a system clock or reducing a frequency of the system clock (clock down). In the sleep mode, the entire operation of the system is not stopped at one time. That is, in the sleep mode, operations of circuits and an operation of a spindle motor are stopped in a predetermined order with respect to passage of time so that the system can be rapidly returned to an active stated when an access is made by a host computer.

At this time, since the spindle motor is operated at a rotational speed corresponding to a clock supplied thereto, the spindle motor is stopped or the speed of the spindle motor is reduced when the clock supplied to the spindle motor is stopped or the frequency of the clock is reduced.

In an information storage apparatus using a disc-like recording medium, if a spindle motor which rotates the disc-like recording medium is stopped, it takes a long time for the spindle motor to rotate at a speed required for recording information on the recording medium. Accordingly, it is preferable not to stop the spindle motor in the sleep mode in which a possibility of access made by the host computer is high.

2. Description of the Related Art

In an optical disc apparatus, when there is no access for a predetermined time period, the above-mentioned sleep mode is set so as to stop circuit operations or an operation of a spindle motor in order to reduce power consumption.

Japanese Laid-Open Patent Application No.7-220370 (Japanese Patent Application No.6-10059) discloses a disc apparatus which performs the above-mentioned control. In this disc apparatus, a servo circuit and a laser diode (LD) are stopped when a count value of a counter exceeds a first setting value. The counter starts a counting operation when an access request is made. Thereafter, a spindle motor is stopped when the count value of the counter exceeds a second setting value, and a frequency of an operation clock of an MPU is reduced so as to reduce power consumption.

If an operation of a disc apparatus is temporarily stopped as is in the disc apparatus of the above-mentioned patent document, a servo circuit and a laser diode are stopped first. In an optical disc such as a magneto-optical disc apparatus, if the operation of the laser diode is stopped and started again, a loading operation similar to that performed when a new magneto-optical disc is loaded must be performed.

Additionally, if a clock frequency for an MPU is reduced when the count value reaches the first setting value, a frequency of a clock for generating a drive signal supplied to the spindle motor is reduced. When the drive signal generated by the clock signal having a reduced frequency is supplied to the spindle motor, a rotational speed of the spindle motor is decreased or the spindle motor is stopped.

If the spindle motor slows down or stops, a laser beam is projected on the same spot of the optical disc. In such a condition, it is possible that data recorded on the magneto-optical disc is destroyed by the laser beam. In order to eliminate such a problem, the laser beam is required to be turned off when the rotational speed of the spindle motor is decreased or the spindle motor is stopped.

However, if the laser beam is turned off, a loading operation similar to that performed when a magneto-optical disc is loaded must be performed in a predetermined sequence when the sleep mode is canceled. Accordingly, there is a problem in that it takes a long time to return from the sleep mode to a regular operation mode.

SUMMARY OF THE INVENTION

It is a general object of the present invention to provide an improved and useful information storage apparatus in which the above-mentioned problems are eliminated.

A more specific object of the present invention is to provide an information storage apparatus in which an operation of the apparatus can be rapidly returned from a sleep mode to a regular operation mode.

Another object of the present invention is to provide a method for controlling a spindle motor used in an information storage apparatus which method enables the information storage apparatus to return from a sleep mode to a regular operation mode in a short time.

In order to achieve the above-mentioned objects, there is provided according to one aspect of the present invention an information storage apparatus for storing information on a recording medium, comprising:

clock generating means for generating a plurality of clocks including a first clock and a second clock having a frequency different from a frequency of the first clock;

control means operated by the first clock for controlling storage of information on the recording medium;

a motor rotating the recording medium at a first speed for storing information, the motor being operated by a clock corresponding to the first clock;

time measuring means for measuring a time after a final access is made; and clock control means for changing the frequency of the first clock when a measured time of the time measuring means reaches a predetermined time, and switching the clock supplied to the motor from the first clock to the second clock.

According to the above-mentioned invention, the motor for rotating the recording medium is operated by the second clock when the frequency of the first clock is reduced to operate the apparatus in a sleep mode. The second clock is generated separately from the first clock, and is able to rotate the motor at a speed approximate to the normal speed. Thus, the rotational speed of the motor is not reduced when the apparatus is set to the sleep mode, and the motor can be rapidly returned to the normal speed.

The information storage apparatus according to the present invention may further comprise abnormal rotation detecting means for performing an abnormality responding process by detecting abnormality in the rotational speed of the motor, wherein the clock control means cancels execution of the abnormality responding process when the clock supplied to the motor is switched from the first clock to the second clock, and sets the rotational speed of the motor to a second speed which is based on the second clock and is detected as a normal speed by the abnormal rotation detecting means; and the clock control means effects execution of the abnormality responding process performed by the abnormal rotation detecting means after the rotational speed of the motor reaches the second speed.

According to the above-mentioned invention, a detection of abnormality is not performed when the clock supplied to the motor is switched. Thus, the clock is smoothly switched from the first clock to the second clock without detection of abnormality.

Additionally, in the information storage apparatus according to the present invention, the clock control means may determine whether the rotational speed of the motor has reached the second speed which approximates the first speed when the clock supplied to the motor is switched from the first clock to the second clock, and the clock control means may effect an operation of the abnormal rotation detecting means when the rotational speed of the motor is determined to be the second speed.

According to this invention, the operation of the abnormal rotation detecting means is effected after the rotational speed of the motor reaches the second speed. Accordingly, abnormality due to a fluctuation in the rotational speed of the motor is not detected when the clock supplied to the motor is changed. Thus, the rotational speed of the motor is smoothly switched from the first speed to the second speed without execution of the abnormality responding process.

Additionally, in the information storage apparatus according to the present invention, the clock control means may include a timer for measuring a time after the clock supplied to the motor is switched from the first clock to the second clock, and the clock control means may determine whether the rotational speed of the motor has reached the second speed which approximates the first speed after a predetermined time is measured by the timer so as to perform an error process when the rotational speed of the motor is determined to be different from the second speed.

According to this invention, since the operation of the abnormal rotation detecting means is effected after the rotational speed of the motor has reached the second speed, the rotational speed of the motor is smoothly switched from the first speed to the second speed without execution of the abnormality responding process.

Additionally, in the information storage apparatus according to the present invention, the clock control means may determine whether the rotational speed of the motor has reached the second speed which approximates the first speed after a predetermined process is performed when the clock supplied to the motor is switched from the first clock to the second clock so that an error process is performed when the rotational speed of the motor is determined to have not reached the second speed.

According to this invention, since the operation of the abnormal rotation detecting means is effected after the rotational speed of the motor has reached the second speed, the rotational speed of the motor is smoothly switched from the first speed to the second speed without execution of the abnormality responding process.

Additionally, the information storage apparatus may further comprise access detecting means for detecting an access being made to the recording medium, wherein the clock control means restores the first clock, when the second clock is supplied to the motor and an access is detected by the access detecting means, so as to switch the clock supplied to the motor from the second clock to the first clock.

According to this invention, when an access to the recording medium is detected, the first clock is restored, and the clock supplied to the motor is switched from the second clock to the first clock. Thus, the rotational speed of the motor can be rapidly switched from the second speed which approximates the first speed to the first speed, which achieves an immediate access to the recording medium.

Additionally, in the information storage apparatus according to the present invention, the clock control means may cancel execution of the abnormality responding process when the clock supplied to the motor is switched from the second clock to the first clock, and may set a rotational speed of the motor, which is determined to be normal by the abnormal rotation detecting means, to the first speed which is based on the first clock; and the clock control means may effect execution of the abnormality responding process performed by the abnormal rotation detecting means after the rotational speed of the motor has reached the first speed.

According to this invention, the detection of abnormality in the rotational speed of the motor is not performed when the clock supplied to the motor is switched from the second speed to the first speed. Thus, the rotational speed of the motor can be smoothly switched from the second speed to the first speed.

Additionally, in the information storage apparatus according to the present invention, the clock control means may determine whether the rotational speed of the motor has reached the first speed when the clock supplied to the motor is switched from the second clock to the first clock, and the clock control means may effect an operation of the abnormal rotation detecting means when the rotational speed of the motor is determined to have reached the first speed.

According to this invention, since the operation of the abnormal rotation detecting means is effected after the rotational speed of the motor has reached the first speed which is achieved by the first clock, the operation of the abnormal rotation detecting means is not performed when a fluctuation occurs in the rotational speed of the motor during a switching operation of the clock supplied to the motor. Thus, the rotational speed of the motor can be smoothly switched from the second speed to the first speed.

Additionally, in the information storage apparatus according to the present invention, the clock control means may include a timer for measuring a time after the clock supplied to the motor is switched from the second clock to the first clock, and the clock control means may determine whether the rotational speed of the motor has reached the first speed after a predetermined time is measured by the timer so as to effect an operation of the abnormal rotation detecting means after the rotation of the motor has reached the first speed.

According to this invention, the detection of abnormality in the rotational speed of the motor is effected after the predetermined time measured by the timer has passed. Accordingly, the operation of the abnormal rotation detecting means is not performed when a fluctuation occurs in the rotational speed of the motor during a switching operation of the clock supplied to the motor. Thus, the rotational speed of the motor can be smoothly switched from the second speed to the first speed.

Additionally, in the information storage apparatus according to the present invention, the clock control means may determine whether the rotational speed of the motor has reached the first speed after performing a predetermined process when the clock supplied to the motor is switched from the second clock to the first clock so as to effect an operation of the abnormal rotation detecting means after the rotational speed of the motor has reached the first speed.

According to this invention, the detection of abnormality in the rotational speed of the motor is effected after the predetermined time measured by the timer has passed. Accordingly, the operation of the abnormal rotation detecting means is not performed when a fluctuation occurs in the rotational speed of the motor during a switching operation of the clock supplied to the motor. Thus, the rotational speed of the motor can be smoothly switched from the second speed to the first speed.

Additionally, the information storage apparatus according to the present invention may further comprise loaded medium detecting means for detecting the recording medium being loaded in the information storage apparatus, wherein an operation of the clock control means is effected when the recording medium being loaded is detected by the loaded medium detecting means.

According to this invention, the operation of the clock control means is effected only when the recording medium is loaded in the information storage apparatus. Thus, an unnecessary operation is not performed when the recording medium is not loaded in the information storage apparatus, resulting in elimination of unnecessary power consumption.

Additionally, the information storage apparatus according to the present invention may further comprising rotation detecting means for detecting rotation of the recording medium being loaded in the information storage apparatus, wherein an operation of the clock control means is effected when rotation of the recording medium is detected by the rotation detecting means.

According to this invention, the operation of the clock control means is effected only when the recording medium is being rotated. Thus, an unnecessary operation is not performed when the recording medium is stopped, resulting in elimination of unnecessary power consumption.

Additionally, there is provided according to another aspect of the present invention a method for controlling a spindle motor which is operated by a first clock for recording information on a recording medium, comprising the steps of:

measuring a predetermined time after a final access is made to the recording medium;

changing a frequency of the first clock when the predetermined time has passed; and switching the clock supplied to the spindle motor from the first clock to a second clock which is not influenced by a change in the frequency of the first clock.

According to the above-mentioned invention, the spindle motor is operated by the second clock having a frequency approximate to the frequency of the first clock which operates the spindle motor at a normal speed when the frequency of the first clock is reduced. Thus, the rotational speed of the spindle motor is not greatly changed, and is rapidly returned to the normal speed.

Other objects, features and advantages of the present invention will become more apparent from the following detailed description when read in conjunction with the accompanying drawings.

BRIEF DESCRIPTION OF THE DRAWINGS

FIG. 9 is a graph showing a change in a rotational speed of the spindle motor shown in FIG. 2 when returning from the sleep mode #2.

DETAILED DESCRIPTION OF THE PREFERRED EMBODIMENT

Figure 1:
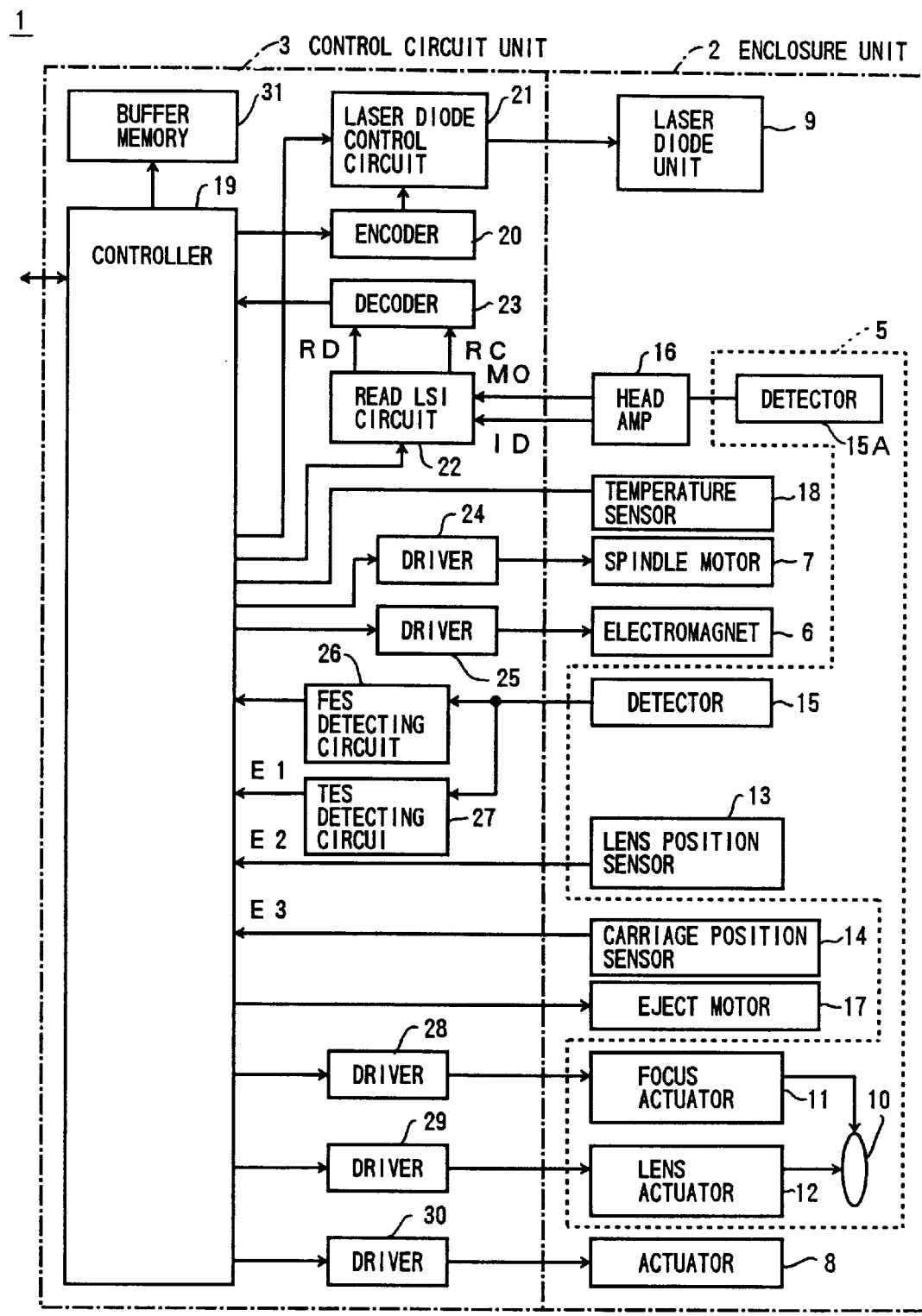
FIG. 1 is a block diagram of a magneto-optical disc apparatus according to an embodiment of the present invention.
Figure 2:
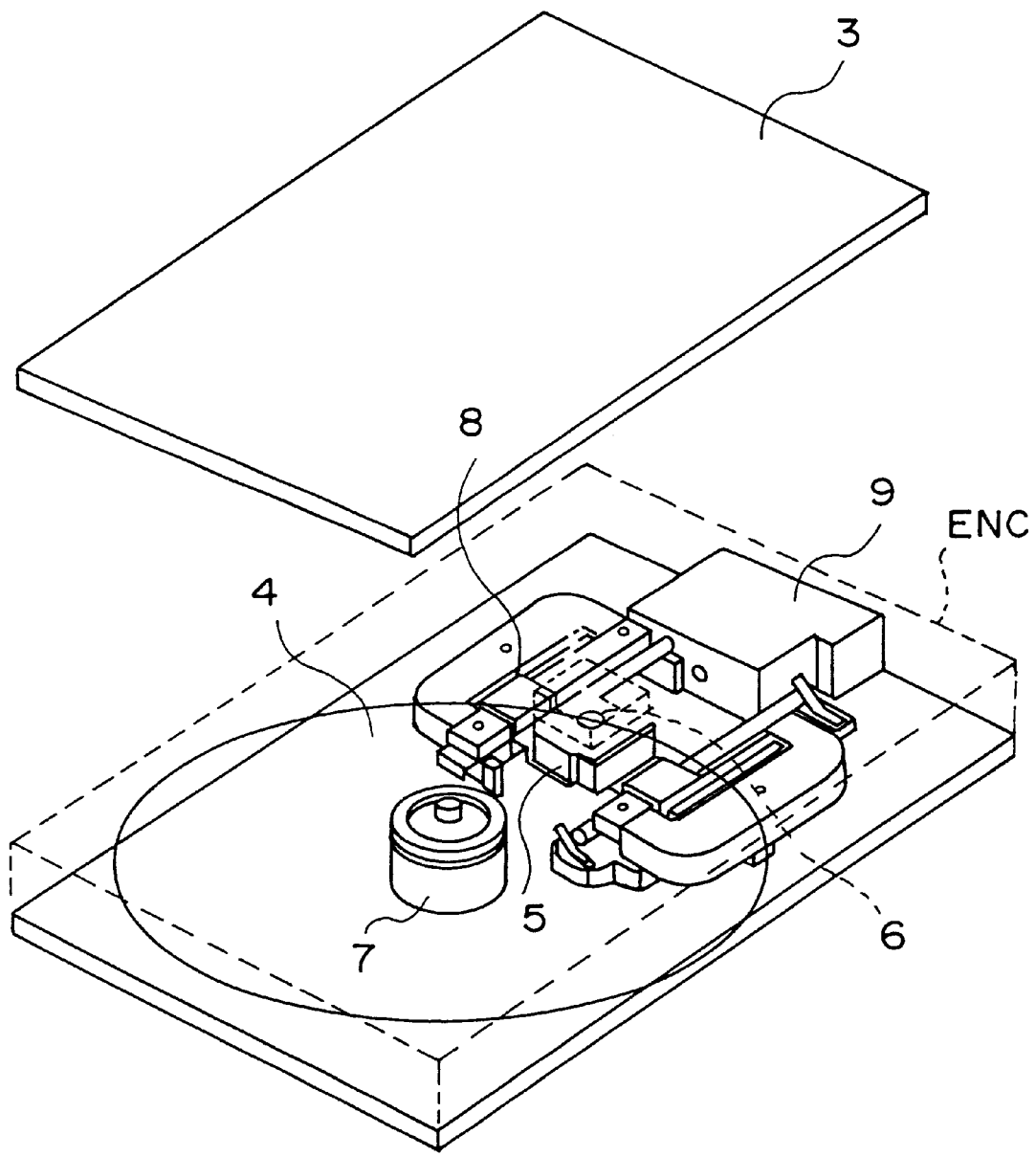
FIG. 2 is a perspective view of an enclosure unit of the magneto-optical disc apparatus shown in FIG. 1.

A description will now be given of an embodiment of the present invention. FIG. 1 shows a block diagram of a magneto-optical disc apparatus 1 according to the embodiment of the present invention. FIG. 2 shows an interior of an enclosure unit 2 shown in FIG. 1.

The enclosure unit 2 is enclosed by an enclosure ENC. A magneto-optical disc 4 is provided at a predetermined position within the enclosure unit 2. An optical pickup 5 faces a surface of the magneto-optical disc 4. An electromagnet 6 is located opposite to the optical pickup 5 with the magneto-optical disc 4 therebetween.

The magneto-optical disc 4 engages a spindle motor 7 at a predetermined loading position so that the magneto-optical disc 4 is rotated by the spindle motor 7 in a direction indicated by an arrow A. The optical pickup 5 and the electromagnet 6 are moved in radial directions of the magneto-optical disc 4 indicated by arrows B. A laser beam is supplied from a laser diode unit 9 to the optical pickup 5. The laser beam supplied to the optical pickup 5 is supplied to an optical system 10 which comprises mirrors and lenses. The optical system 10 is operated by a focus actuator 11 and a lens actuator 12. The optical system 10 focuses the laser beam supplied by the laser diode unit 9, and projects the focused laser beam to a predetermined position of the magneto-optical disc 4. A position of the lenses of the optical system 10 is detected by a lens position sensor 13 so that the lens actuator 12 is controlled based on a result of detection of the lens position sensor 13. Additionally, a position of the optical pickup 5 is detected by a carriage position sensor 14 so that an actuator 8 is controlled based on a result of detection of the carriage position sensor 14 and a position of the magneto-optical disc 4.

The laser beam projected onto the magneto-optical disc 4 is reflected and returned to the optical pickup 5. The laser beam reflected and returned to the magneto-optical disc 4 is split by the optical system 10 so as to be incident on detectors 15A and the 15B.

The detector 15A detects a signal corresponding to a phase difference between the laser beam projected onto the magneto-optical disc 4 and the laser beam reflected by the magneto-optical disc 4, and sends the detected signal to a head amplifier 16. The head amplifier 16 amplifies the signal supplied by the detector 15A, and supplies the amplified signal to a control circuit unit 3.

On the other hand, the detector 15B detects a projected position of the laser beam and a focused state of the laser beam projected on the magneto-optical disc 4 in accordance with a shape of the laser beam reflected by the magneto-optical disc 4.

The magneto-optical disc 4 is loaded into and unloaded from the enclosure unit 2. The enclosure unit 2 is provided with a temperature sensor 18 that measures a temperature inside the enclosure 2 and supplies a result of the measurement to the control circuit unit 3.

The control circuit unit 3 is connected to the electromagnet 6, the actuator 8, the laser diode unit 9, the focus actuator 11, the lens position sensor 13, the carriage position sensor 14, the detector 15B, the head amplifier 16, an eject motor 17 and the temperature sensor 18. The control circuit unit 3 controls information writing and reading operations.

The control circuit unit 3 comprises a controller 19 which is fixed on the enclosure ENC of the enclosure unit 2 so as to control writing and reading operations and a sleep mode. The control circuit unit 3 further comprises an encoder 20, a laser diode control circuit 21, a read LSI circuit 22, a decoder 23, a driver 24, a driver 25, an FES detecting circuit 26, a TES detecting circuit 27, drivers 28, 29 and 30, and a buffer memory 31. The encoder 20 encodes control signals supplied by the controller 19. The laser diode control circuit 21 controls a power of a laser beam projected from the laser diode unit 9 provided in the enclosure unit 2 in response to a code output from the encoder 20. The read LSI circuit 22 decodes a reproduction signal supplied by the head amplifier 16. The decoder 23 decodes the demodulated data output from the read LSI circuit 22, and supplies the decoded data to the controller 19. The driver 24 produces a drive signal for driving the spindle motor 7 in response to a control signal supplied by the controller 19. The driver 25 produces a drive signal for generating a magnetic field in response to a control signal supplied by the controller 19. The FES detecting circuit 26 detects a focus error signal detected by the detector 15B of the enclosure unit 2, and supplies the focus error signal to the controller 19. The TES detecting circuit 27 detects a tracking error signal in response to the signal detected by the detector 15B of the enclosure unit 2, and supplies the tracking error signal to the controller 19. The driver 28 produces a drive signal for driving the focus actuator 11 of the enclosure unit 2 in response to a control signal supplied by the controller 19. The driver 29 produces a drive signal for driving the lens actuator 12 of the enclosure unit 2 in response to a control signal supplied by the controller 19. The driver 30 produces a drive signal for driving the actuator 8 of the enclosure unit 2 in response to a control signal supplied by the controller 19. The buffer memory 31 is connected to the controller 19 so as to store read and write information.

The controller 19 controls writing and reading operations for the magneto-optical disc 4 in response to an access request by an upper order apparatus. At this time, the controller 19 sets a sleep mode which sequentially stops operations of circuits so as to reduce power consumption when there is no access made by an upper order apparatus for a predetermined time period.

The sleep mode includes a sleep mode #1, a sleep mode #2 and sleep mode #3.

The sleep mode #1 is set from a regular operation mode after a predetermined time period, for example, 0.5 sec, has passed after a final access is made by the upper order apparatus. In the sleep mode #1, a focus gain control operation, an operation of the read LSI circuit 22 and an operation of an amplifier for an RF signal in the head amplifier 16 are stopped.

The sleep mode #2 is set from the sleep mode #1 after a predetermined time period, for example, 1.0 sec, has passed after a final access is made by the upper order apparatus. In the sleep mode #2, a clock for reading and writing operations is stopped. Additionally, a focus servo operation and a supply of a power to the lens position sensor 13 are stopped. Further, operations of the FES detecting circuit, the TES detecting circuit 27 and drivers 28, 29 and 30 are stopped. Additionally, a frequency of a clock for a DSP 32, an ODC 34 and a control circuit 33 is reduced from a normal frequency.

It should be noted that the frequency of the normal frequency for the DSP 32 is, for example, 70 MHz, and is reduced to $1/869$ in the sleep mode #2. The frequency of the normal frequency for the ODC 34 is, for example, 40 MHz, and is reduced to $1/16$ in the sleep mode #2. The frequency of the normal frequency for the control circuit 33 is, for example, 50 MHz, and is reduced to $1/8$ in the sleep mode #2.

When the frequencies of the clocks for the DSP 32, the ODC 34 and the control circuit 33 are reduced, a frequency of the clock for driving the spindle motor 7 is set to a frequency which is not influenced by the reduction in the frequencies of the clocks for the DSP 32, the ODC 34 and the control circuit 33. Additionally, a reference clock is set to a clock approximate to a supplied clock. Thereby, a reduction in a rotational speed of the spindle motor 7 is reduced.

The sleep mode #3 is set from the sleep mode #2 after a predetermined time period, for example, 1 minute, has passed after a final access is made by the upper order apparatus. In the sleep mode #3, an operation for automatically correcting eccentricity of the magneto-optical disc 4 is stopped. Additionally, an operation of the DSP 32 is stopped. Further, a rotation of the spindle motor 7 and an emission of the laser beam of the laser diode unit 9 are stopped.

Figure 3:
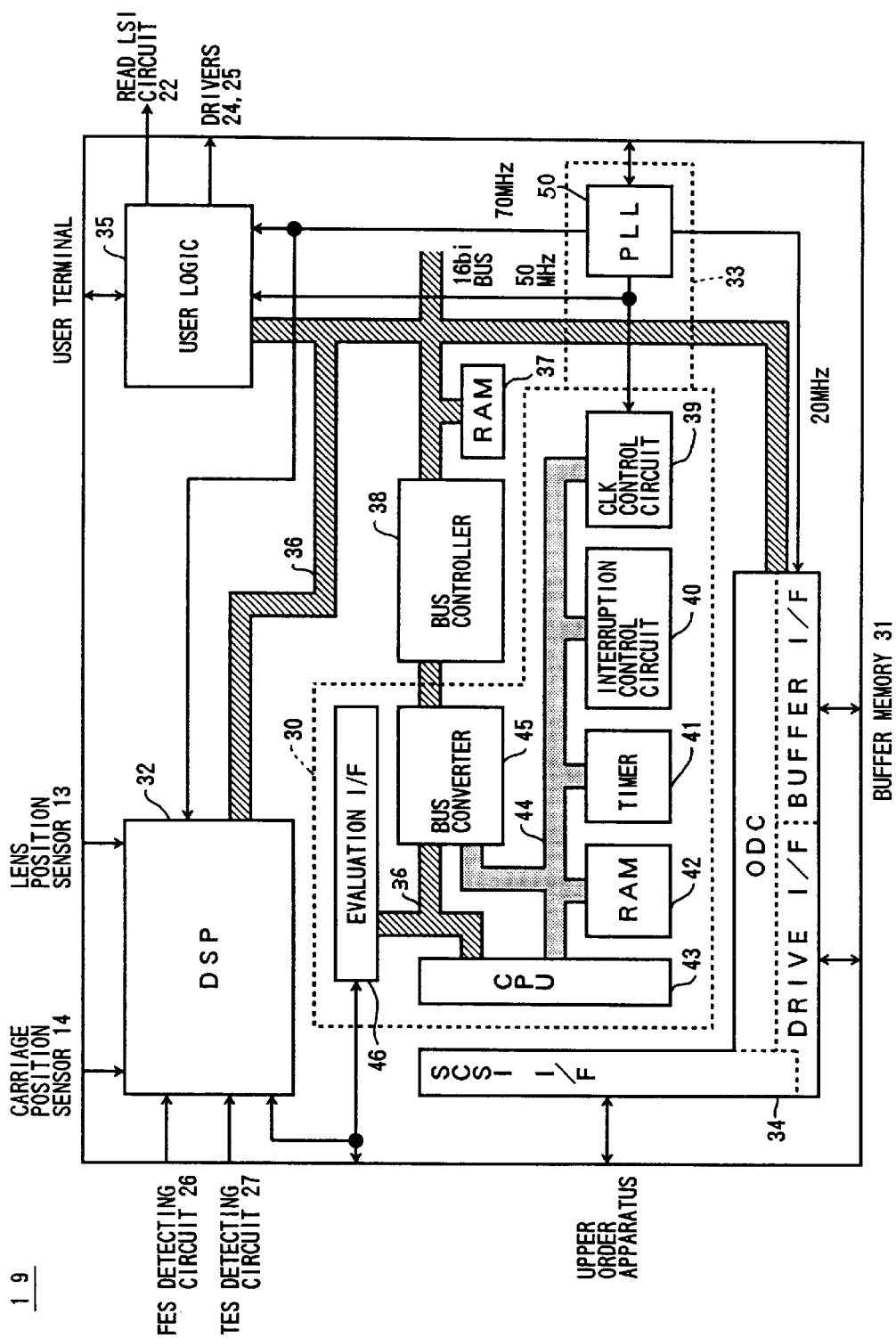
FIG. 3 is a block diagram of a controller shown in FIG. 1.

FIG. 3 shows a block diagram of the controller 19 shown in FIG. 1. The controller 19 performs the sleep mode by reducing the frequencies of the clocks.

The controller 19 comprises the DSP 32 which performs a servo control for mainly controlling frequencies of various clocks, the control circuit 33 which controls various processes and the ODC 34 which interfaces each section. The DSP 32, the control circuit 33, the ODC 34 and a user logic 35 are connected to each other via a common bus 36. The common bus 36 is connected to a RAM 37, which is used as a common work area. Additionally, connection of each of the DSP 32, the control circuit 33, the ODC 34 and the user logic 35 is controlled by a bus controller 38.

The DSP 32 is connected to the FES detecting circuit 26, the TES detecting circuit 27, the lens position sensor 13 and the carriage position sensor 14. The DSP 32 generates a control signal for controlling a focussing and a tracking.

The control circuit 33 comprises a PLL circuit 50, a clock control circuit 39, an interruption control unit 40, a timer 41, a RAM 42, a CPU 43, a local bus 44, a bus converter 45 and an evaluation IF circuit 46. The PLL circuit 50 produces a clock used by the controller 19 from an externally provided clock. The clock control circuit 39 controls the clock supplied by the PLL circuit 50, and generates various clocks. The interruption control unit 40 issues an interruption command by detecting a predetermined condition so as to perform an interruption process. The timer 41 measures various periods. The RAM 42 stores programs and data. The CPU 43 performs various processing. The local bus 44 connects the clock control circuit 39, the interruption control unit 40, the timer 41, the RAM 42 and the CPU 43 to each other. The bus converter 45 controls a connection between the local bus 44 and the common bus 36. The evaluation IF circuit 46 interfaces communications with external devices.

A clock CLK0 is supplied to the control circuit 33. The control circuit 33 produces a plurality of clocks CLK1 to CLKn by using the clock CLK0 as a reference clock.

The control circuit 33 controls an operation of the spindle motor 7, an interruption process of the interruption control unit 40, an operation of the timer 41 and an operation of the DSP 32. Additionally, the control circuit 33 controls sequential shifting to one of the sleep modes #1 to #3.

Figure 4:
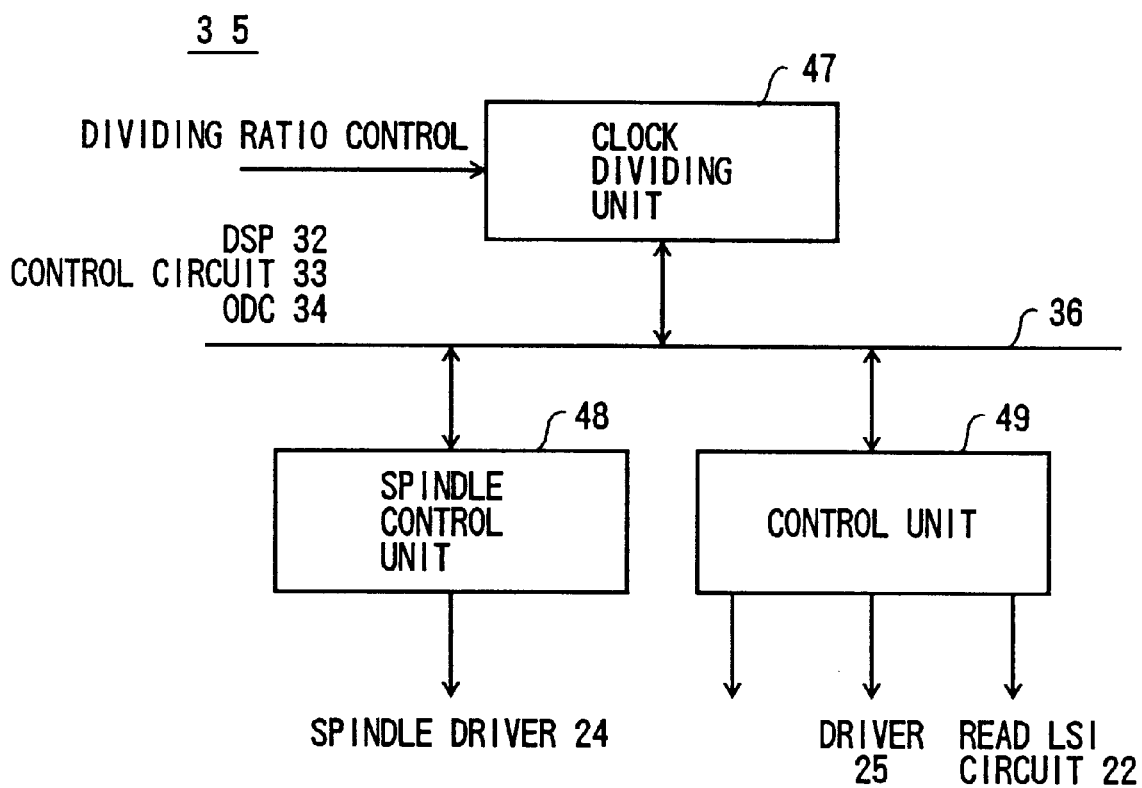
FIG. 4 is a block diagram of a user logic circuit shown in FIG. 3.

FIG. 4 shows a block diagram of the user logic 35 shown in FIG. 3.

The user logic comprises a clock dividing unit 47, a spindle control unit 48 and a control unit 49. The clock dividing unit 47 divides the frequency of the clock supplied by the control circuit 33. The spindle control unit 48 controls the driver 24 which supplies the drive signal to the spindle motor 7. The control unit 49 controls other operations.

The clock dividing unit 47, the spindle control unit 48 and the control unit 49 are connected to the common bus 36, and operations thereof are controlled by the clocks and commands supplied by the control circuit 33.

A 70-MHz clock is supplied to the clock dividing unit 47 from the control circuit 33 when a regular operation is performed or the sleep mode #1 is set. The clock dividing unit 47 divides the 70-MHz clock to obtain, for example, a 35-MHz clock, and supplies the divided clock to the spindle control unit 48 as an operation clock.

The frequency of the clock supplied to the clock dividing unit 47 is changed when the sleep mode #2 is set. The clock supplied to the clock dividing unit 47 is the same as that used for driving, for example, the drivers in the user logic 35, and is generated separately from the clocks used by the control circuit 33, the DSP 32 and the ODC 34. This clock is, for example, a 50-MHz clock.

When the operation is shifted from the sleep mode #1 to the sleep mode #2, the control circuit 33 changes the 50-MHz clock to a clock having a frequency most approximate the frequency of 35 MHz. It should be noted that the frequency selected from among the frequencies generated by the control circuit 33 can be any frequency from which a frequency approximate to the frequency used for the regular rotational speed is obtained by frequency division.

The clock dividing unit 47 divides the 50-MHz clock into a frequency of approximately 35 MHz, and supplies the divided clock to the spindle control unit 48.

The spindle control unit 48 is connected to the driver 24 which drives the spindle motor 7, and generates a control signal so as to rotate the spindle motor 7 at a speed corresponding to the operation clock.

Additionally, the control unit 49 is connected to the read LSI circuit 22 and the driver 25 which drives the electromagnet 6, and controls information reading and writing operations.

Accordingly, if the frequencies of the clocks to the DSP 32, the control circuit 33 and the ODC 34 are reduced when the sleep mode #2 is set, the operation clock having a frequency approximate to the frequency of the regular operation clock is supplied to the spindle control unit 48. Thus, the spindle motor 7 can be rotated at a speed nearly equal to the normal speed.

Figure 5:
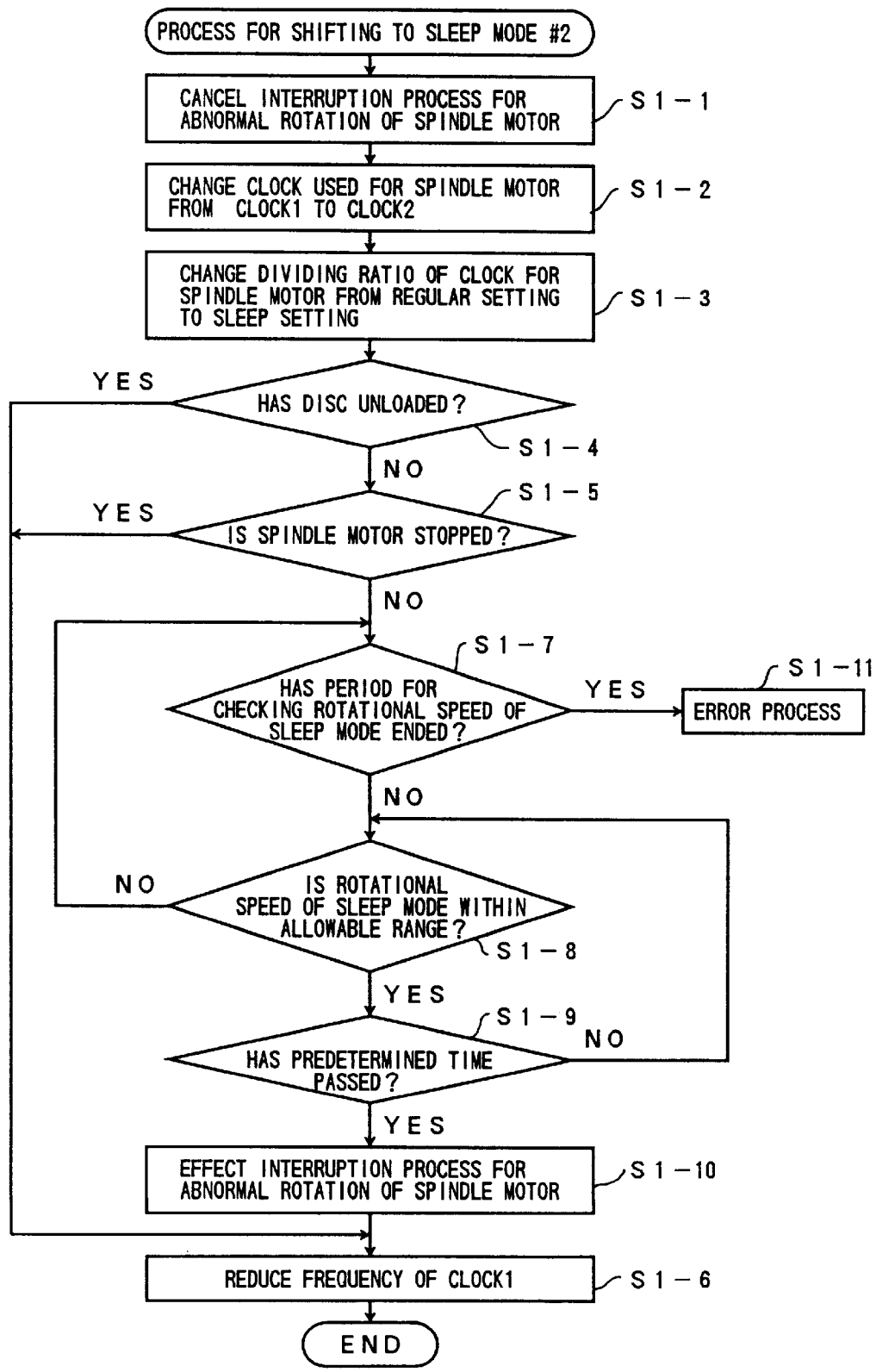
FIG. 5 is a flowchart of a process for shifting to a sleep mode #2.

A description will now be given of an operation of the control circuit 33 when the operation is shifted from the sleep mode #1 to the sleep mode #2. FIG. 5 is a flowchart of an operation for shifting to the sleep mode #2.

The operation of the apparatus is shifted to the sleep mode #2 when there is no access made by an upper apparatus for 10 seconds, for example. When the operation shown in FIG. 5 is started, a setting for an interruption process for an abnormal condition is cancelled or enabled, in step S1-1, so as to change the rotational speed of the spindle motor 7.

Then, in step S1-2, the clock used for controlling the spindle motor 7 is changed from the clock CLK1 (70 MHz) to the clock CLK2 (50 MHz) which is not influenced by the setting of the sleep mode. In relation to this, a dividing ratio is changed to that for the sleep mode, in step S1-3, so as to set the rotational speed of the spindle motor 7 to a speed approximate to the normal speed.

Thereafter, it is determined, in step S1-4, whether the magneto-optical disk 4 is not loaded in the apparatus. Additionally, it is determined, in step S1-5, whether or not the spindle motor 7 has stopped.

If it is determined that the magneto-optical disc 4 is not loaded in the apparatus or the spindle motor 7 has stopped, the routine proceeds to step S1-6 so as to reduce the frequency of the clock CLK1.

If it is determined, in steps S1-4 and S1-5, that the magneto-optical disc 4 is loaded in the apparatus and the spindle motor 7 is being rotated, the routine proceeds to step S1-7. In step S1-7, it is determined whether or not a period for checking the rotational speed of the spindle motor 7 in the sleep mode has ended. If it is determined that the period for checking has not ended, the routine proceeds to step S1-8.

In step S1-8, it is determined whether or not the rotational speed of the spindle motor 7 is within an allowable range for the sleep mode #2. If it is determined that the rotational speed is not within the allowable range, the routine returns to step S1-7. On the other hand, if it is determined that the rotational speed of the spindle motor 7 is within the allowable range, the routine proceeds to step S1-9.

In step S1-9, it is determined whether or not the rotational speed of the spindle motor 7 has been continuously maintained at a predetermined speed corresponding to the dividing ratio set in step S1-3 within the allowable range for a predetermined period. If it is determined that the rotational speed of the spindle motor 7 has not been maintained for the predetermined period, the routine returns to step S1-8. On the other hand, if it is determined that the rotational speed has been continuously maintained for the predetermined period, it is determined that the control for the rotational speed of the spindle motor is normally ended, and the routine proceeds to step S1-10. In step S1-10, a setting for an interruption process for an abnormal condition of the spindle motor 7 is effected, and the routine proceeds to step S1-6. In step S1-6, the frequency (50 MHz) of the clock CLK1 which is normally used for driving the spindle motor 7 is reduced to one-eighth.

It should be noted that if it is determined, in step S1-7, that the period for checking is ended, the routine proceeds to step S1-11 so as to perform an error process.

Figure 6:
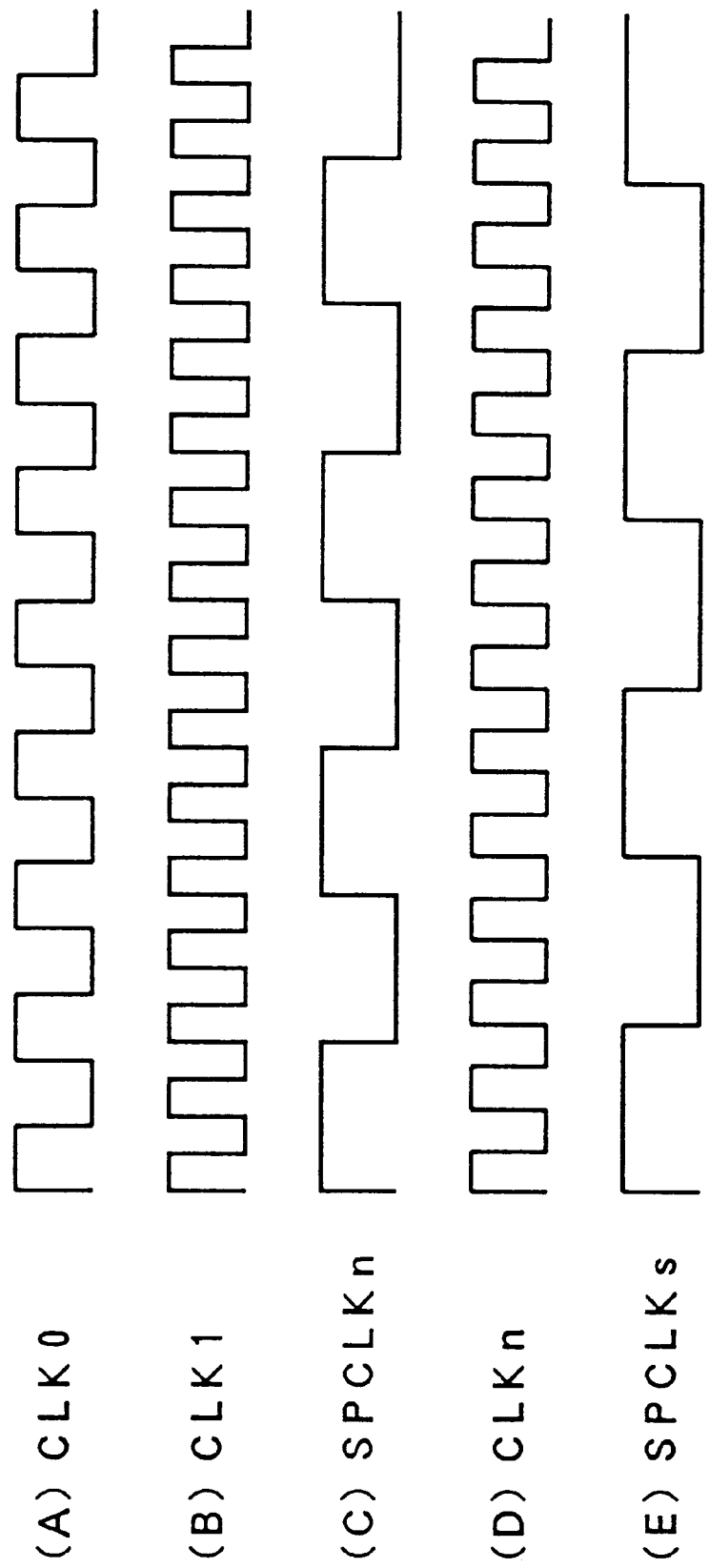
FIG. 6 is a waveform chart of clock signals generated in the magneto-optical disc apparatus shown in FIG. 1.

FIG. 6 shows a waveform chart of the clocks used in the present embodiment.

FIG. 6-(A) represents the basic clock CLK0; FIG. 6-(B) represents the clock CLK1 used for driving the spindle motor 7 during the regular operation mode; FIG. 6-(C) represents a clock SPCLKn used by the spindle motor 7; FIG. 6-(D) is the clock CLKn which is used for driving the spindle motor 7 when shifted to the sleep mode #2; FIG. 6-(E) is a clock SPCLKs used in the spindle motor 7 when shifted to the sleep mode #2.

The control circuit 33 generates the clock CLK1 shown in FIG. 6-(B) from the basic clock CLK0 shown in FIG. 6-(A), the clock CLK1 being the operation clock for the DSP 32. The control circuit 33 also generates the clock CLKn shown in FIG. 6-(D) which is not influenced by the reduction in frequencies of the clocks for the DSP 32, the control circuit 33 and the ODC 34 when the sleep mode #2 is set.

In the user logic 35, the clock dividing unit 47 divides the clock CLK1 shown in FIG. 6-(B) supplied by the control circuit 33 by two so as to obtain the clock SPCLKn shown in FIG. 6-(C) which has the frequency 35 MHz. Additionally, the clock dividing unit 47 divides the clock CLKn shown in FIG. 6-(D) so as to obtain the clock SPCLKs shown in FIG. 6-(E) which has an approximate frequency of 35 MHz.

Figure 7:
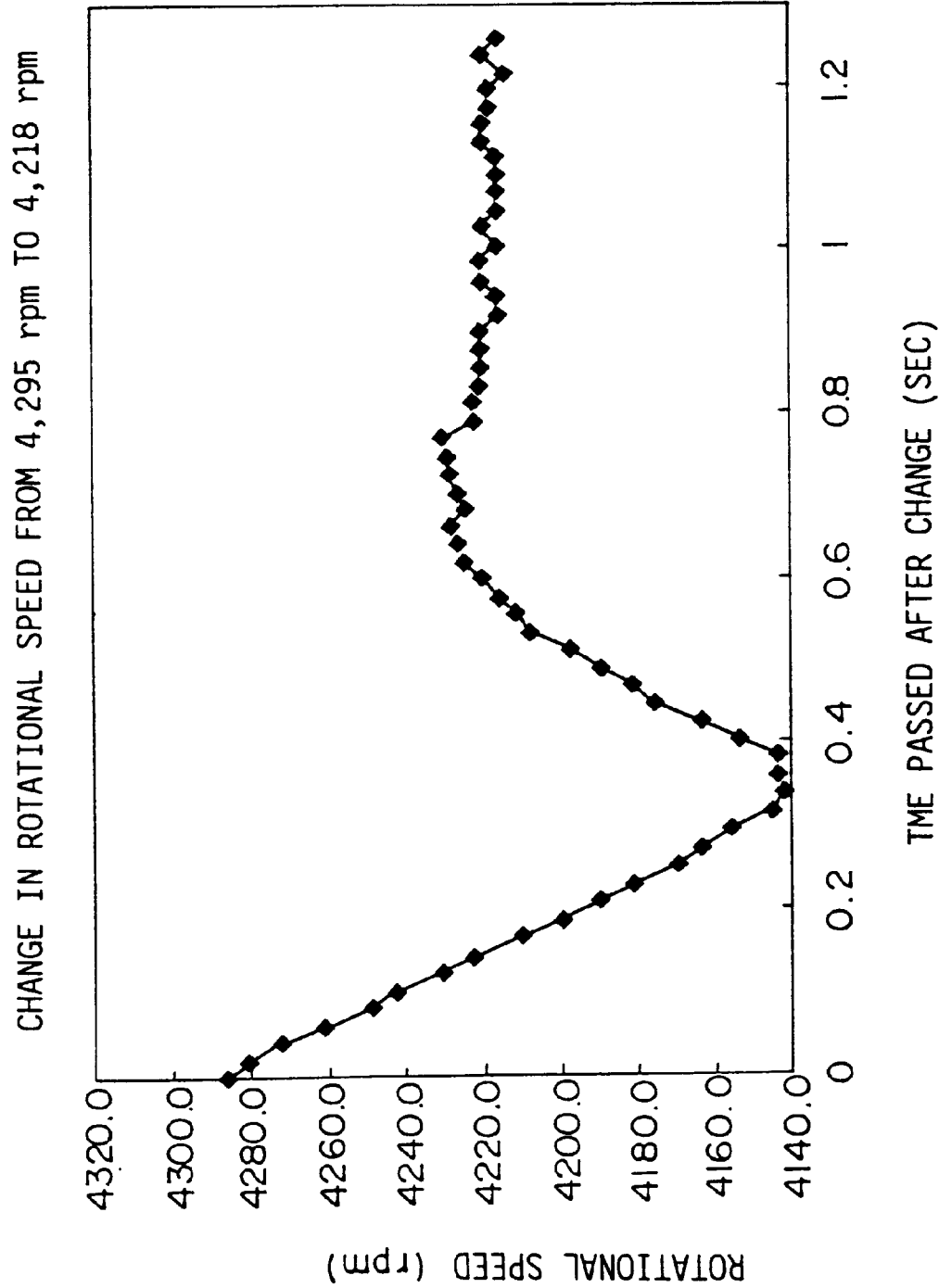
FIG. 7 is a graph showing a change in a rotational speed of a spindle motor shown in FIG. 2 when the sleep mode #2 is set.

FIG. 7 is a graph showing a change in a rotational speed of the spindle motor 7 when the operational mode is shifted from the sleep mode #1 to the sleep mode #2. In FIG. 7, the horizontal axis represents the time passed after the operation clock of the spindle motor 7 is changed from the clock CLK1 to the clock CLKn, and the vertical axis represents a rotational speed of the spindle motor 7.

As shown in FIG. 7, when the operation clock of the spindle motor 7 is changed from the clock CLK1 to the clock CLKn, the rotational speed of the spindle motor 7 is temporarily reduced from 4,295 rpm, which is a normal speed controlled by the clock CLK1, to about 4,140 rpm. Thereafter, within about 0.8 seconds, the rotational speed of the spindle motor 7 is stabilized at a speed of 4,218 rpm which is controlled by the clock CLKn.

As mentioned above, when the operation clock of the spindle motor 7 is changed from the clock CLK1 to the clock CLKn, a certain time period is needed for the spindle motor 7 to be stabilized at the constant speed of 4,218 rpm which is controlled by the clock CLKn. Accordingly, as the process of steps S1-7 to S1-9 is performed, the rotation of the spindle motor 7 is not determined as abnormal rotation within the period of 0.8 seconds during which the process for detecting an abnormality in the rotation of the spindle motor 7 is ineffective. Thus, the operational mode is smoothly shifted to the sleep mode #2 without unnecessary detection of errors in the operational speed of the spindle motor 7.

Figure 8:
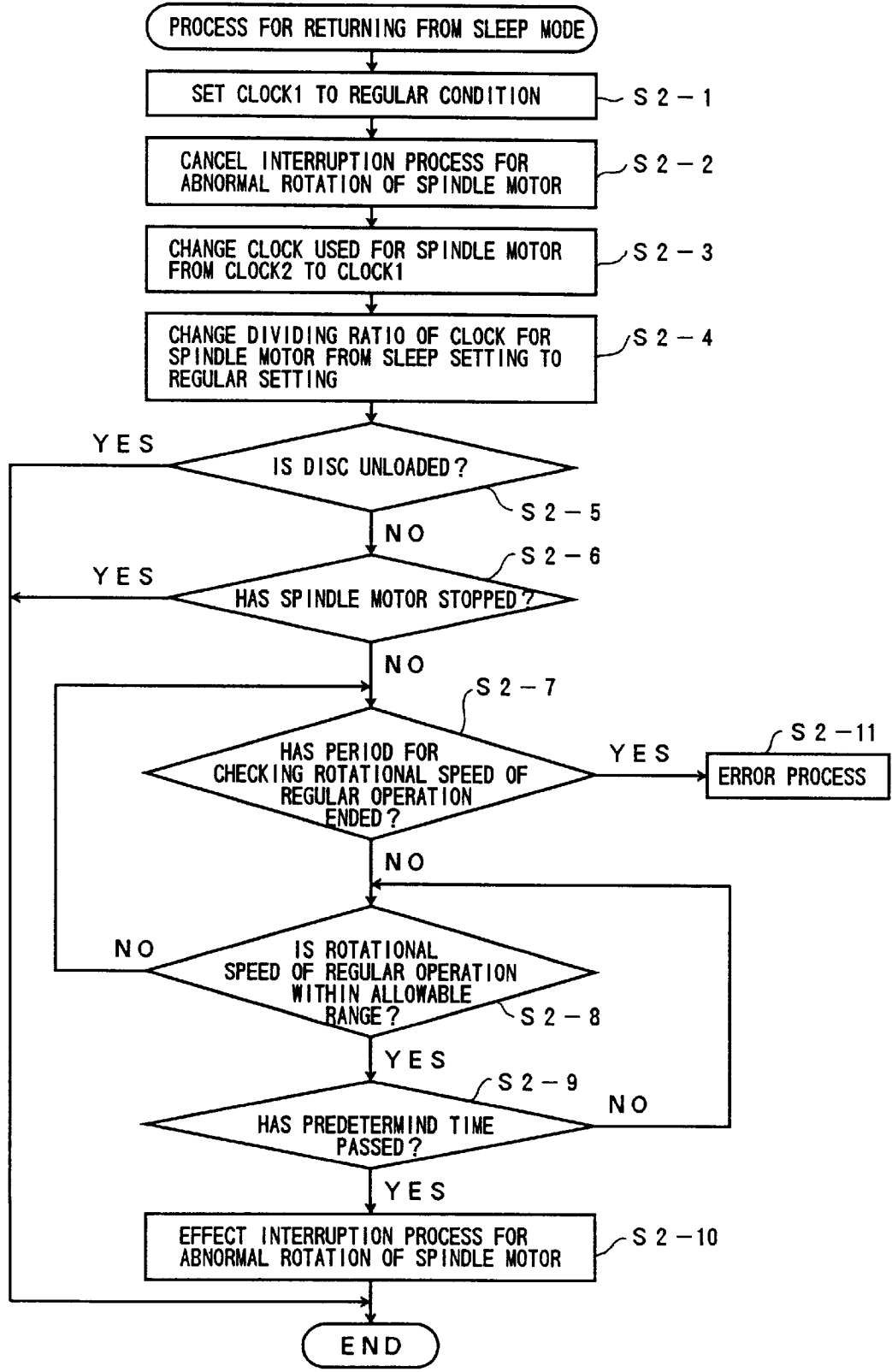
FIG. 8 is a flowchart of a process for returning from a sleep mode #2.

A description will now be given of an operation of the control circuit 33 when returning from the sleep mode #2 to the regular operation mode. FIG. 8 shows a flowchart of the operation for returning from the sleep mode #2.

When the operation of FIG. 8 is started, the clock CLK1 is returned, in step S2-1, to the normal condition. Thereafter, the setting for an interruption process for an abnormal condition is cancelled or enabled, in step S2-2, so as to change the rotational speed of the spindle motor 7 to a normal speed.

Then, in step S2-3, the clock used for controlling the spindle motor 7 is changed from the clock CLK2 to the clock CLK1 which is used for controlling the rotational speed of the spindle motor 7 in a normal condition. In step S2-4, a dividing ratio is changed to that for the normal operation mode, in step S2-4.

Thereafter, it is determined, in step S2-5, whether the magneto-optical disk 4 is unloaded. Additionally, it is determined, in step S2-6, whether or not the spindle motor 7 has stopped.

If it is determined that the magneto-optical disc 4 is not loaded in the apparatus or the spindle motor 7 has stopped, the routine is ended.

If it is determined, in steps S2-5 and S2-6, that the magneto-optical disc 4 is loaded in the apparatus and the spindle motor 7 is being rotated, the routine proceeds to step S2-7. In step S2-7, it is determined whether or not a checking operation of the rotational speed of the spindle motor has been completed within a predetermined time period. If it is determined that the checking operation has been completed within the time period, the routine proceeds to step S2-8.

In step S2-8, it is determined whether or not the rotational speed of the spindle motor is within an allowable range for the normal operation speed. If it is determined that the rotational speed is not within the allowable range for the normal operation speed, the routine returns to step S2-7. On the other hand, if it is determined that the rotational speed of the spindle motor is within the allowable range for the normal operation speed, the routine proceeds to step S2-9.

In step S2-9, it is determined whether or not the rotational speed of the spindle motor 7 has been continuously maintained at a predetermined speed corresponding to the dividing ratio set in step S2-4 within the allowable range for a predetermined period. If it is determined that the rotational speed of the spindle motor 7 has not been maintained for the predetermined period, the routine returns to step S2-8. On the other hand, if it is determined that the rotational speed has been continuously maintained for the predetermined period, it is determined that the control for the rotational speed of the spindle motor 7 has normally ended, and the routine proceeds to step S2-10. In step S2-10, a setting for an interruption process for an abnormal condition of the spindle motor 7 is effected, and the routine is ended.

It should be noted that if it is determined, in step S2-7, that the checking operation for the rotational speed of the spindle motor 7 has not been completed within the predetermined time period, the routine proceeds to step S2-11. so as to perform an error process.

FIG. 9 is a graph showing a change in a rotational speed of the spindle motor 7 when the operational mode is returned from the sleep mode #2. In FIG. 9, the horizontal axis represents the time passed after the operation clock of the spindle motor 7 is changed from the clock CLKn to the clock CLK1, and the vertical axis represents a rotational speed of the spindle motor 7.

As shown in FIG. 9, when the operation clock of the spindle motor 7 is changed from the clock CLKn to the clock CLK1, the rotational speed of the spindle motor 7 is temporarily increased from 4,218 rpm, which is a speed controlled by the clock CLKn, to about 4,320 rpm. Thereafter, within about 0.5 seconds from the start of change, the rotational speed of the spindle motor 7 is stabilized at a speed of 4,295 rpm which is controlled by the clock CLK1 used for the normal operation speed.

As mentioned above, when the operation clock of the spindle motor 7 is changed from the clock CLKn to the clock CLK1, a certain time period is needed for the spindle motor 7 to be stabilized at the constant speed of 4,295 rpm which is controlled by the clock CLK1. Accordingly, as the process of steps S2-7 to S2-9 is performed, the rotation of the spindle motor 7 is not determined as abnormal rotation within the period of 0.5 seconds during which the process for detecting an abnormality in the rotation of the spindle motor 7 is ineffective. Thus, the operational mode is smoothly shifted from the sleep mode #2 to the regular operation mode without unnecessary detection of errors in the operational speed of the spindle motor 7.

According to the above-mentioned embodiment, when the clock supplied to the spindle motor 7 in the normal operation mode is stopped or the frequency of the clock supplied to the spindle motor 7 in the normal operation mode is reduced in the sleep mode, the spindle motor is maintained at a speed near the normal operational speed by temporarily using a clock which is not affected by the setting of the sleep mode. The temporarily used clock can be switched to the normally used clock when the sleep mode is canceled so that the rotational speed of the spindle motor 7 is returned to the normal operational speed.

Additionally, when the sleep mode is set, the clock supplied to the spindle motor 7 is changed to the clock which is not influenced by the sleep operation, and the dividing ratio for the clock is set so that the rotational speed of the spindle motor 7 is maintained near the regular rotational speed. When returning from the sleep mode to the regular operation mode, the clock supplied to the spindle motor 7 is changed to the regularly used clock, and then the clock used for the sleep mode is changed to the regularly used clock. Thereafter, the dividing ratio of the clock for the sleep mode is changed to the dividing ration of the clock for the regular operation mode. According to the above-mentioned operation, if the clock used for the sleep mode is stopped or the frequency of the clock used for the sleep mode is reduced, there is no need to perform the same operation as for loading a disc when returning from the sleep mode. Thus, a time for returning from the sleep mode is reduced.

It should be noted that although a magneto-optical disc apparatus is used as an example of the information storage apparatus, the present invention is not limited to the magneto-optical disc apparatus and is applicable to any apparatus which uses a medium requiring a time to return from a sleep mode.

The present invention is not limited to the specifically disclosed embodiment, and variations and modifications may be made without departing from the scope of the present invention.

The present application is based on Japanese priority application No.9-301051 filed on Oct. 31, 1997, the entire contents of which are hereby incorporated by reference.

What is claimed is:

1. An information storage apparatus for storing information on a recording medium, comprising:

clock generating means for generating a plurality of clocks including a first clock and a second clock having a frequency different from a frequency of the first clock;

control means operated by said first clock for controlling storage of information on said recording medium;

a motor rotating said recording medium at a first speed for storing information, said motor being operated by a clock corresponding to said first clock;

time measuring means for measuring a time after a final access is made; and clock control means for changing the frequency of said first clock when a measured time of said time measuring means reaches a predetermined time, and switching the clock supplied to said motor from said first clock to said second clock.

2. The information storage apparatus as claimed in claim 1, further comprising abnormal rotation detecting means for performing an abnormality responding process for handling abnormality by detecting abnormality in the rotational speed of said motor, wherein said clock control means cancels execution of the abnormality responding process when the clock supplied to said motor is switched from said first clock to said second clock, and sets the rotational speed of said motor to a second speed which is based on said second clock and is detected as a normal speed by said abnormal rotation detecting means; and said clock control means effects execution of the abnormality responding process performed by said abnormal rotation detecting means after the rotational speed of said motor reaches said second speed.

3. The information storage apparatus as claimed in claim 2, wherein said clock control means determines whether the rotational speed of said motor has reached said second speed which approximates said first speed when the clock supplied to said motor is switched from said first clock to said second clock, and said clock control means effects an operation of said abnormal rotation detecting means when the rotational speed of said motor is determined to be said second speed.

4. The information storage apparatus as claimed in claim 2, wherein said clock control means includes a timer for measuring a time after the clock supplied to said motor is switched from said first clock to said second clock, and said clock control means determines whether the rotational speed of said motor has reached said second speed which approximates said first speed after a predetermined time is measured by said timer so as to perform an error process when the rotational speed of said motor is determined to be different from said second speed.

5. The information storage apparatus as claimed in claim 2, wherein said clock control means determines whether the rotational speed of said motor has reached said second speed which approximates said first speed after performing a predetermined process when the clock supplied to said motor is switched from said first clock to said second clock so as to perform an error process when the rotational speed of said motor is determined to have not reached said second speed.

6. The information storage apparatus as claimed in claim 1, further comprising access detecting means for detecting an access being made to said recording medium, wherein said clock control means restores said first clock, when the second clock is supplied to said motor and an access is detected by said access detecting means, so as to switch the clock supplied to said motor from said second clock to said first clock.

7. The information storage apparatus as claimed in claim 2, wherein said clock control means cancels execution of the abnormality responding process when the clock supplied to said motor is switched from said second clock to said first clock, and sets a speed of said motor, which is determined to be normal by said abnormal rotation detecting means, to said first speed which is based on said first clock; and said clock control means effects execution of the abnormality responding process performed by said abnormal rotation detecting means after the rotational speed of said motor has reached said first speed.

8. The information storage apparatus as claimed in claim 2, wherein said clock control means determines whether the rotational speed of said motor has reached said first speed when the clock supplied to said motor is switched from said second clock to said first clock, and said clock control means effects an operation of said abnormal rotation detecting means when the rotational speed of said motor is determined to have reached said first speed.

9. The information storage apparatus as claimed in claim 2, wherein said clock control means includes a timer for measuring a time after the clock supplied to said motor is switched from said second clock to said first clock, and said clock control means determines whether the rotational speed of said motor has reached said first speed after a predetermined time is measured by said timer so as to effect an operation of said abnormal rotation detecting means after the rotation of said motor reaches said first speed.

10. The information storage apparatus as claimed in claim 2, wherein said clock control means determines whether the rotational speed of said motor has reached said first speed after performing a predetermined process when the clock supplied to said motor is switched from said second clock to said first clock so as to effect an operation of said abnormal rotation detecting means after the rotational speed of said motor reaches said first speed.

11. The information storage apparatus as claimed in claim 1, further comprising loaded medium detecting means for detecting said recording medium being loaded in said information storage apparatus, wherein an operation of said clock control means is effected when said recording medium being loaded is detected by said loaded medium detecting means.

12. The information storage apparatus as claimed in claim 1, further comprising rotation detecting means for detecting rotation of said recording medium being loaded in said information storage apparatus, wherein an operation of said clock control means is effected when rotation of said recording medium is detected by said rotation detecting means.

13. A method for controlling a spindle motor which is operated by a first clock for recording information on a recording medium, comprising the steps of:

measuring a predetermined time after a final access is made to said recording medium;

changing a frequency of said first clock when the predetermined time has passed; and switching the clock supplied to said spindle motor from said first clock to a second clock which is not influenced by a change in the frequency of said first clock.

* * * * *